(12) United States Patent
Harmon et al.

(10) Patent No.: US 7,986,983 B2
(45) Date of Patent: Jul. 26, 2011

(54) METHODS AND SLIDER FORM FACTOR DEVICES WITH CONTINGUOUS SURFACES WHEN OPEN

(75) Inventors: Roger W Harmon, Crystal Lake, IL (US); Paul Koch, Plantation, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 705 days.

(21) Appl. No.: 11/965,887

(22) Filed: Dec. 28, 2007

(65) Prior Publication Data

US 2009/0170573 A1 Jul. 2, 2009

(51) Int. Cl.
*H04M 1/00* (2006.01)
(52) U.S. Cl. .................. 455/575.4; 361/727; 235/472.02
(58) Field of Classification Search .......................... None
See application file for complete search history.

(56) References Cited

U.S. PATENT DOCUMENTS

| | | | |
|---|---|---|---|
| 5,088,068 A | 2/1992 | Schaill et al. | |
| 6,775,560 B2 | 8/2004 | King et al. | |
| 7,653,422 B2 * | 1/2010 | Roberts | 455/575.4 |
| 2003/0064758 A1 | 4/2003 | Mizuta et al. | |
| 2005/0237699 A1 | 10/2005 | Carroll | |
| 2006/0172786 A1 | 8/2006 | Lo | |
| 2006/0178176 A1 * | 8/2006 | Kwak et al. | 455/575.4 |
| 2006/0284531 A1 | 12/2006 | Dubon | |
| 2007/0155451 A1 | 7/2007 | Lee | |
| 2007/0243897 A1 * | 10/2007 | Maatta et al. | 455/550.1 |
| 2010/0160010 A1 | 6/2010 | Ladouceur et al. | |

FOREIGN PATENT DOCUMENTS

| | | |
|---|---|---|
| JP | 2000106594 A | 4/2000 |
| KR | 1020050034434 A | 4/2005 |
| KR | 1020060062841 A | 6/2006 |
| KR | 100696317 B1 | 3/2007 |
| KR | 100698131 B1 | 3/2007 |

OTHER PUBLICATIONS

International Searching Authority; PCT Search Report; PCT/US2008/085299; CS34430; Jun. 22, 2009.

* cited by examiner

*Primary Examiner* — Phuoc Doan
(74) *Attorney, Agent, or Firm* — Gary J. Cunningham

(57) ABSTRACT

Disclosed are methods and devices of a slider form factor device including two housings. The top surface of a lower housing may include a QWERTY keypad, or a display screen of any type. The top surface of an upper housing may include a display screen. The device is configured to allow the bottom face of the upper housing to slide with respect to the top face of the lower housing until a limit of travel is reached. At the end of travel, the lower housing and the upper housing do not overlap. The upper housing drops down so that its top face is contiguous with the top face of the lower housing. Moreover, the upper housing is tilted with respect to the lower housing by a predetermined angle. In this way, the upper housing and the lower housing may abut to form substantially contiguous surfaces.

19 Claims, 5 Drawing Sheets

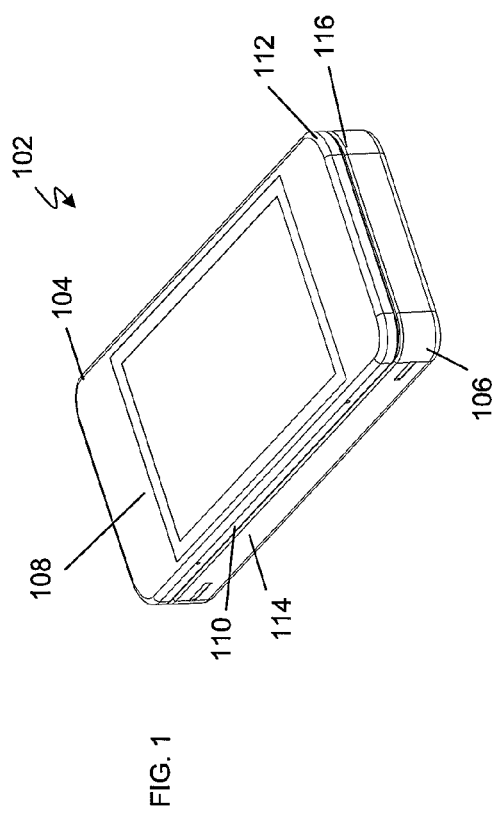
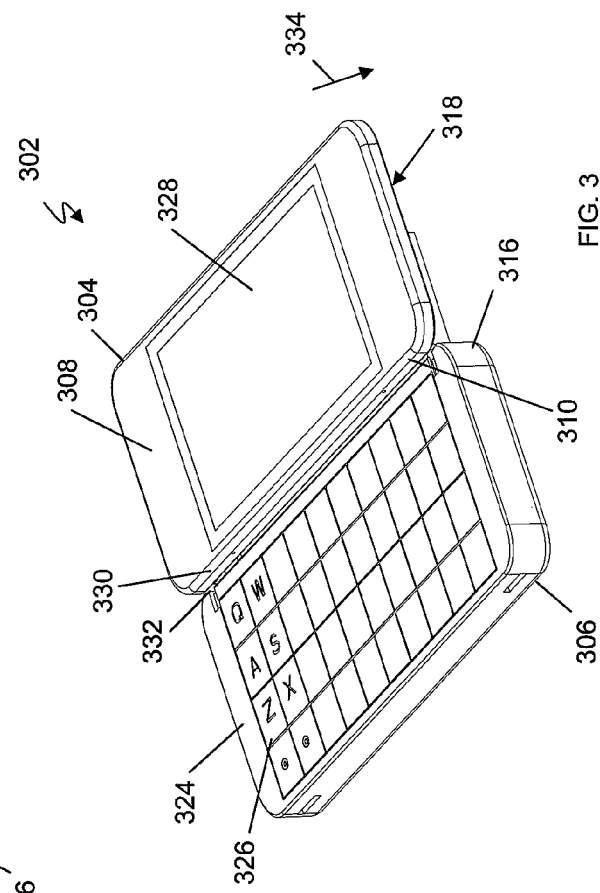
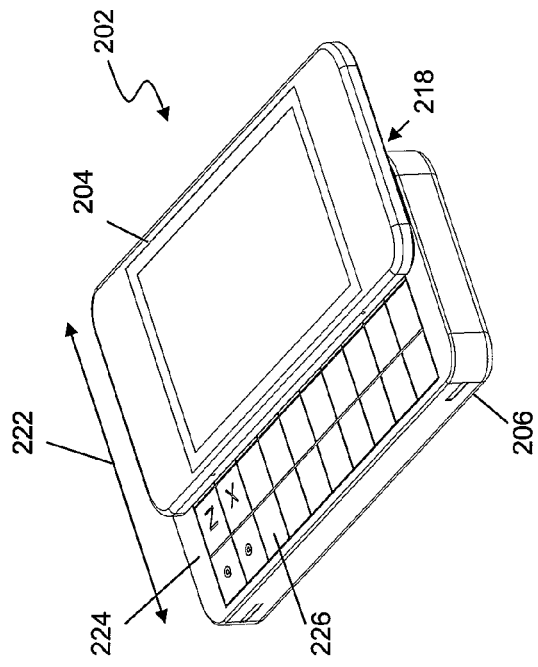

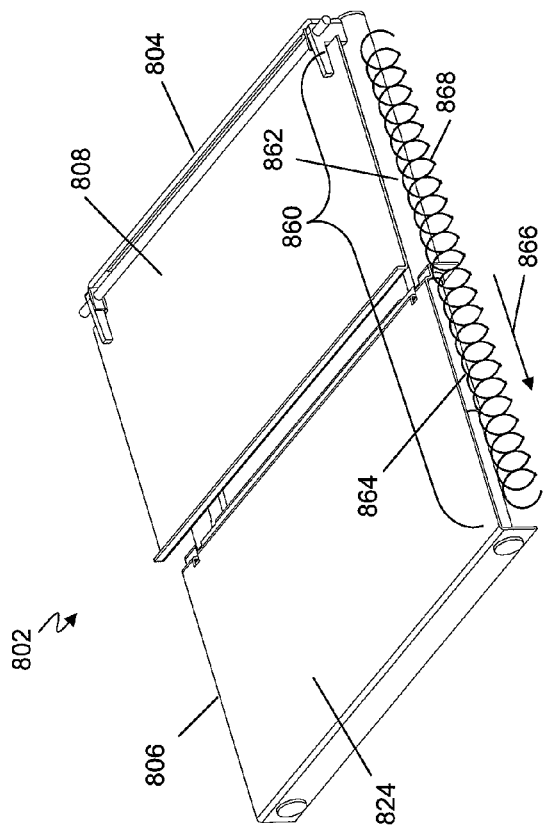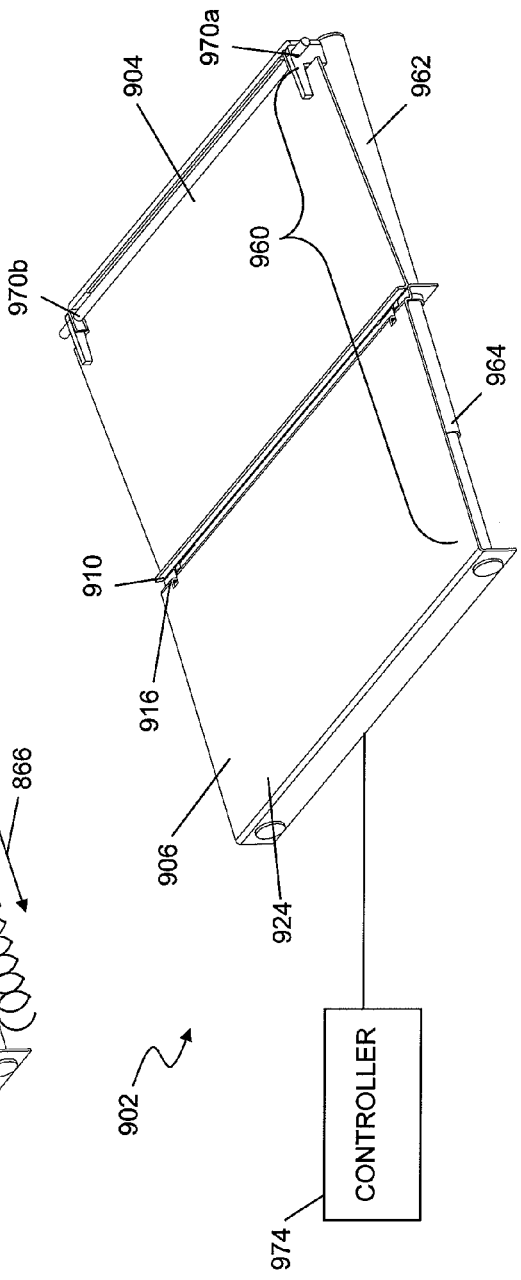

ns and Slider Form Factor
METHODS AND SLIDER FORM FACTOR DEVICES WITH CONTINGUOUS SURFACES WHEN OPEN

CROSS REFERENCE TO RELATED APPLICATIONS

This application is related to co-pending U.S. patent application Ser. No. 11/965,932, "Methods And Slider Form Factor Devices With Contiguous Surfaces When Open", filed Month Day, Year, which is incorporated by reference herein in its entirety.

FIELD

Disclosed are methods and devices of a slider form factor device, and more particularly, methods and devices of a slider form factor device including two housings that may tilt with respect to one another.

BACKGROUND

Mobile communication devices are designed for many different purposes. In some devices, QWERTY keypads are included. For a user who uses a device to input a substantial amount of text, a device with a QWERTY keypad may be preferred. A device including a QWERTY keypad is typically larger than a device with a standard numeric keypad.

The makers of mobile communication devices, including those of cellular telephones, are increasingly adding functionality to their devices. While there is a trend toward the inclusion of more features and improvements for current features, there is also a trend toward smaller mobile communication devices. As mobile communication device technology has continued to improve, the devices have become increasingly smaller. For a device including a QWERTY keypad in particular, the more surface area that is beneficially utilized, the smaller the device may be.

In most QWERTY keypad devices, there has been a tradeoff between providing adequate surface area for the QWERTY keypad and keeping the overall size of the product to a minimum. Once a slider form factor device is fully opened, there is generally an overlap of the top surface and the bottom surface of greater than 15 mm. In such a case, the housing of the QWERTY keypad must be large enough to fully expose the QWERTY keypad considering the overlap.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 depicts an embodiment of a slider form factor device in the closed position so that the upper (or first) housing and the lower (or second) housing are adjacent one another;

FIG. 2 depicts the slider form factor device showing that the bottom face of the upper or first housing may slide with respect to the top face of the lower or second housing;

FIG. 3 depicts the slider form factor device in an extended position so that the upper housing and the lower housing do not overlap;

FIG. 8 is a perspective view of another embodiment of the slider form factor device in the open position incorporating a telescoping slide mechanism;

FIG. 9 is yet another perspective view of the slider form factor device incorporating telescopic rails in the open position to depict the first housing tilted with respect to the second housing.

Figure 4:
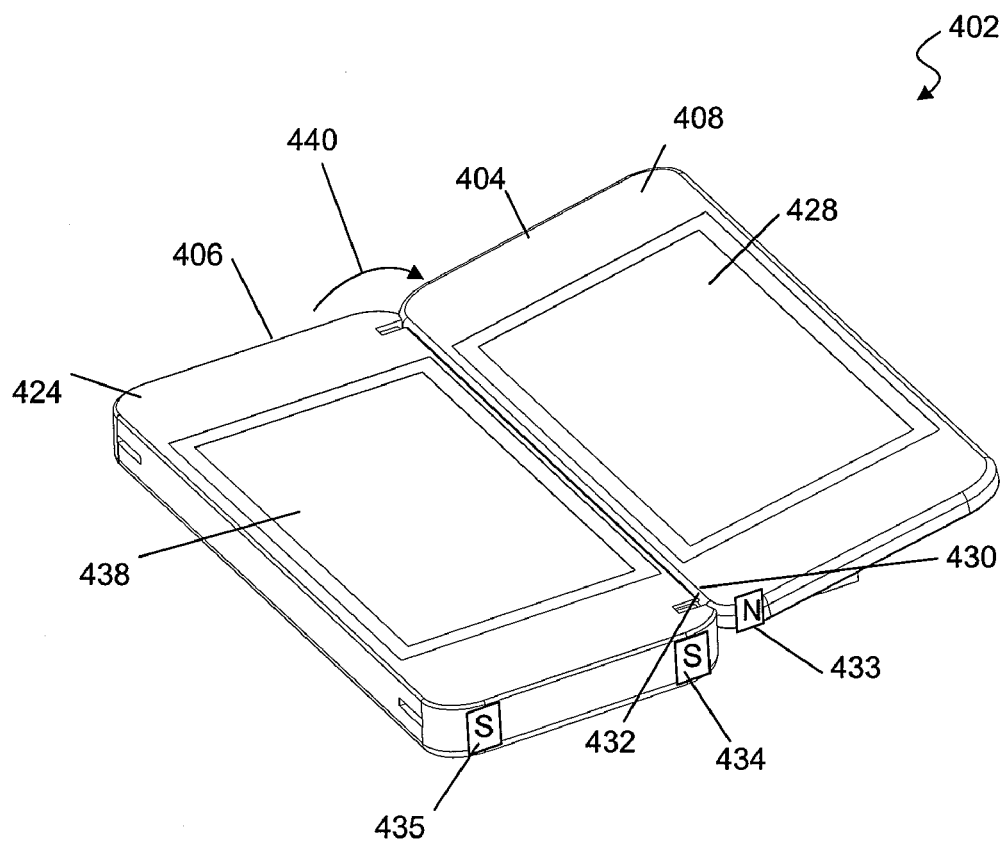
FIG. 4 illustrates an embodiment of the described slider form factor device having two display screens on the top surfaces of the two housings that form substantially contiguous surfaces.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

It would be beneficial if the top surface of the QWERTY keypad housing and the top surface of the display housing did not overlap. Also, it would be beneficial were the housing of the QWERTY keypad minimized so that its surface area is predominately utilized by the QWERTY keypad. It would also be beneficial were the top surface of the QWERTY key pad housing and the top surface of the display housing to abut and form substantially contiguous surfaces. It would be further beneficial if there were a predetermined angle formed between the contiguous surfaces to so that the display of the display housing may be at an angle with respect to the QWERTY keypad of the keypad housing so that a user may easily view the display while using the keypad.

Disclosed are methods and devices of a slider form factor device including two housings. The top surface of a lower housing may include a QWERTY keypad, or a display screen of any type, for example, a touch screen display configured to display a QWERTY keypad. The top surface of an upper housing includes for example, a display screen.

The disclosed device is configured to slide the bottom face of the upper housing with respect to the top face of the lower housing until a limit of travel is reached. That is, the limit of travel is configured so that, at the end of travel, the lower housing and the upper housing do not overlap. That is, the bottom face of the upper housing slides with respect to the top face of the lower housing until an edge of each housing meet and then at that point, the upper housing may drop down so that the top face of the upper housing and the top face of the lower housing form contiguous surfaces, accordingly reaching the limit of travel. In this way, the top surface of the QWERTY key pad housing (the lower housing) and the top surface of the display housing (the upper housing) do not overlap. Moreover, the surface area of the housing of the QWERTY keypad (the lower housing) may be reduced so that its surface area is predominately utilized by the QWERTY keypad since it does not overlap with the display housing (the upper housing).

Further disclosed are methods and devices of a slider form factor device where once the limit of travel is reach as described above, the upper housing may pivot with respect to the lower housing so that the upper housing is tilted with respect to the lower housing by a predetermined angle. In this way, the upper housing and the lower housing may abut to form substantially contiguous surfaces of the top face (QWERTY keypad surface) of the lower housing and the top face (display surface) of the upper housing. Accordingly, the predetermined angle formed between the contiguous surfaces of the QWERTY keypad surface and the display surface may provide easy viewing of the display by a user while using the keypad.

Also disclosed are various implementations and embodiments of the above described methods and devices of a slider form factor device including two housings. The size of the housing of the QWERTY keypad (the lower housing) may be reduced so that its surface area is predominately utilized by the QWERTY keypad since it does not overlap with the display housing (the upper housing) when in the open position. Therefore, the device as a whole may be small enough to fit in a user's hand, and the opening sliding mechanism described in more detail below may be activated by the push of a user's thumb, requiring limited action by the user. Accordingly, a smaller and more manageable slider form factor device may be a beneficial design option.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

At least some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts an embodiment of a slider form factor device 102 in the closed position so that and the upper (or first) housing 104 and the lower (or second) housing 106 are adjacent one another. The device includes a top face 108 of the first housing 104, a first end 110 of the first housing 104 and a second end 112 of the first housing 104. The device further includes a first end 114 of the second housing 106 and a second end 116 of the second housing 106.

The slider form factor device may be a mobile communication device or may also not include communication capabilities, such as a stand-alone calendar device. The device 102 may be implemented as a cellular telephone (also called a mobile phone). The device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

FIG. 2 depicts the slider form factor device 202 showing that the bottom face 218 of the upper or first housing 204 may slide with respect to the top face 220 of the lower or second housing 206. The arrow 222 indicates the direction of sliding of the first housing 204 with respect to the second housing 206. Since the top face 224 of the second housing 206 may include a keypad such as a QWERTY keypad, friction from sliding the two faces, 218 and 224 may be reduced in one embodiment by a low friction surface, by dampening rails or the like, so as to avoid damage to the keypad 226. The size of the second housing 206 (the lower housing) including a QWERTY keypad may be reduced so that its surface area is predominately utilized by the QWERTY keypad since it does not overlap with the display housing (the upper housing) when in the open position. Accordingly, the device as a whole may be small enough to fit in a user's hand, and the opening sliding mechanism described in more detail below may be activated by the push of a user's thumb, requiring limited action by the user. Accordingly, a smaller and more manageable slider form factor device may be a beneficial design option.

FIG. 3 depicts the slider form factor device 302 in an extended position so that the upper (first) housing 304 and the lower (second) housing 306 do not overlap. As mentioned above, the disclosed device 302 is configured to slide the bottom face 318 of the upper housing 304 with respect to the top face 324 of the lower housing 306 until a limit of travel is reached. That is, at the end of travel, the lower housing 306 and the upper housing 304 do not overlap. Accordingly, the surface area of the lower housing 306 including QWERTY keypad 326 may be reduced so that surface area of the face 324 is predominately utilized by the QWERTY keypad 326 since it does not overlap with the upper housing 304 that carries the display 328.

A first edge 330 of the first housing 304 is defined by the top face 308 of the first housing 304 and the first end 310 of the first housing 304. A second edge 332 of the second housing 306 is defined by the top face 324 of the second housing 306 and the second end 316 of the second housing 306. At the end of travel, the first housing 304 can drop in the direction of arrow 334 so that the first edge 330 and the second edge 332 abut. Accordingly, the top face 308 of the first housing 304 and the top face 324 of the second housing 306 form substantially contiguous surfaces.

FIG. 4 illustrates an embodiment of the described slider device 402 having two display screens 428 and 438 on the top surfaces of the two housings that form substantially contiguous surfaces. As mentioned above, at the end of travel, the first housing 404 can drop in the direction of arrow 334 (see FIG. 3) so that the first edge 430 and the second edge 432 abut to form substantially contiguous surfaces of the top face 408 of the first housing 404 and the top face 424 of the second housing 406. That is, the first housing 404 is in contact with the second housing 406 and the first housing 404 is tilted with respect to the second housing by a predetermined angle 440.

In a previously discussed embodiment, a QWERTY keypad 326 (see FIG. 3) is carried on the surface 324 of the second housing 306. In the embodiment presently discussed, each surface 408 and 424 includes a display 428 and 438 respectively. In one embodiment, the displays 428 and 438 are borderless displays. Various techniques are used to form borderless displays. When implemented with borderless displays 428 and 438, the displays on the substantially contiguous surfaces may appear as a single display. In another embodiment, the display 438 may be a touch screen keypad.

Various devices and methods may be used as a detent to keep the first housing 404 and the second housing 406 secured in the closed position. Moreover, the same mechanisms may keep the device secured in the open position as well. For example, a plurality of magnets 433, 434 and 435 may be located to hold the first housing and the second housing in two respective relative positions, the open position and the closed position. For example a magnet 433 and a magnet 434 may be configured so that together they may act to hold the device 402 in an open position. That is, the magnets may be arranged so that, when the device 402 is in the open position, the north pole N of magnet 433 may be adjacent the south pole S of magnet 434. Moreover, a magnet 435 may be configured so that, when the device is in its closed position, the magnet 433 and the magnet 435 act to hold the device in its closed position. That is, the magnet 435 may be arranged so that, when the device 402 is in the closed position, the north pole N of magnet 433 may be adjacent the south pole S of magnet 435.

Figure 5:
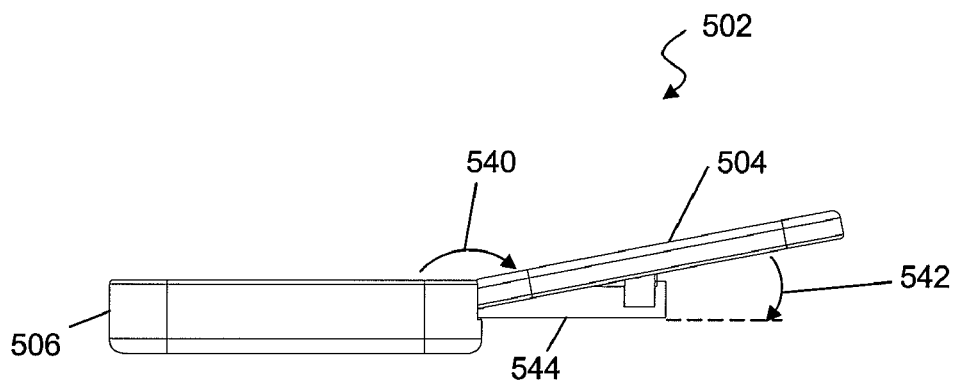
FIG. 5 is a side view of the slider form factor device that illustrates the angle by which the first housing is tilted with respect to the second housing.

FIG. 5 is a side view of the slider form factor device 502 that illustrates the angle by which the first housing 504 may be tilted with respect to the second housing 506 when the device 502 is in the open position. The housings form an angle 540 therebetween. Also an angle 542 is formed between the first housing 504, and the line of the slide member 544 configured to slidably and pivotably couple the first housing 504 and the second housing 506. The angle 542 may be for example 11 degrees. Any suitable angle is within the scope of this discussion. As will be discussed below, the slide member 544 may include a first set of rails configured to travel the set of first tracks of the first housing 504 and a second set of rails configured to travel the set of second tracks of the second housing 506. A slide member may have a thickness of, for example, 4.5 mm.

Figure 6:
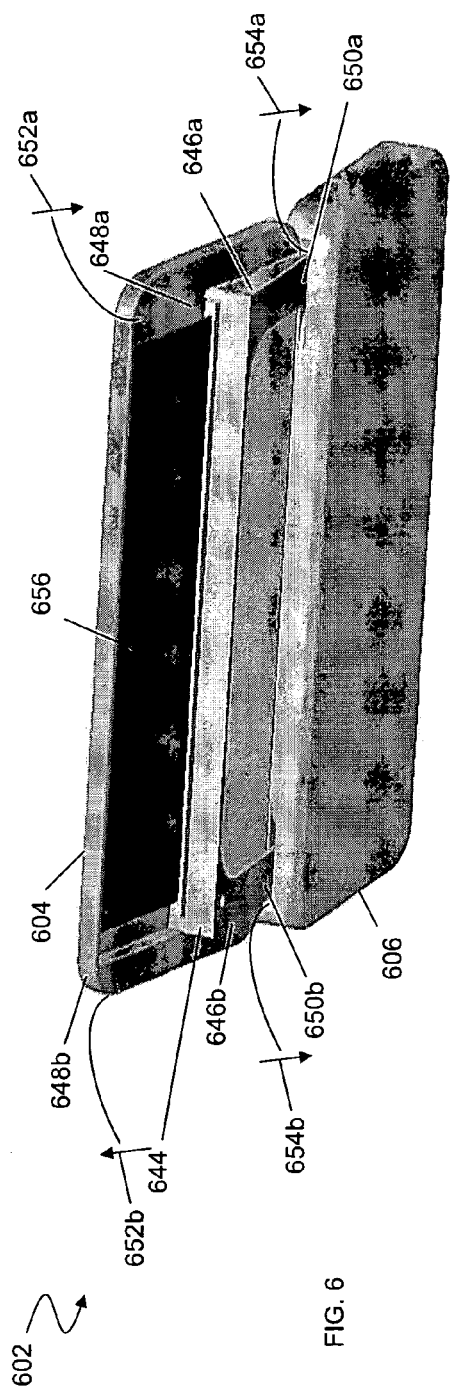
FIG. 6 is a rear view of an embodiment of the slider form factor device in the open position including a slide member fully extended.

FIG. 6 is a rear view of an embodiment of the slider form factor device 602 in the open position including an embodiment of a slide member 644 fully extended. The slide member 644 is depicted as in the extended position, where a set of rails 646a and 646b are fully extended along the first tracks 648a and 648b and set of rails (not shown) are fully extended along the second tracks. In this embodiment, the second housing 606 includes tracks in its interior 650a and 650b. Arrows 652a and 652b depict the direction in which the first set of rails 646a and 646b extend along the first tracks 648a and 648b for the opening of the device 602. Arrows 654a and 654b depict the direction in which the second set of rails (see FIG. 7) extend along the second tracks 650a and 650b in the interior of the second housing 606 for the closing of the device 602. The slide member 644 cooperates with a plate 656 that is coupled to the first housing 604.

Figure 7:
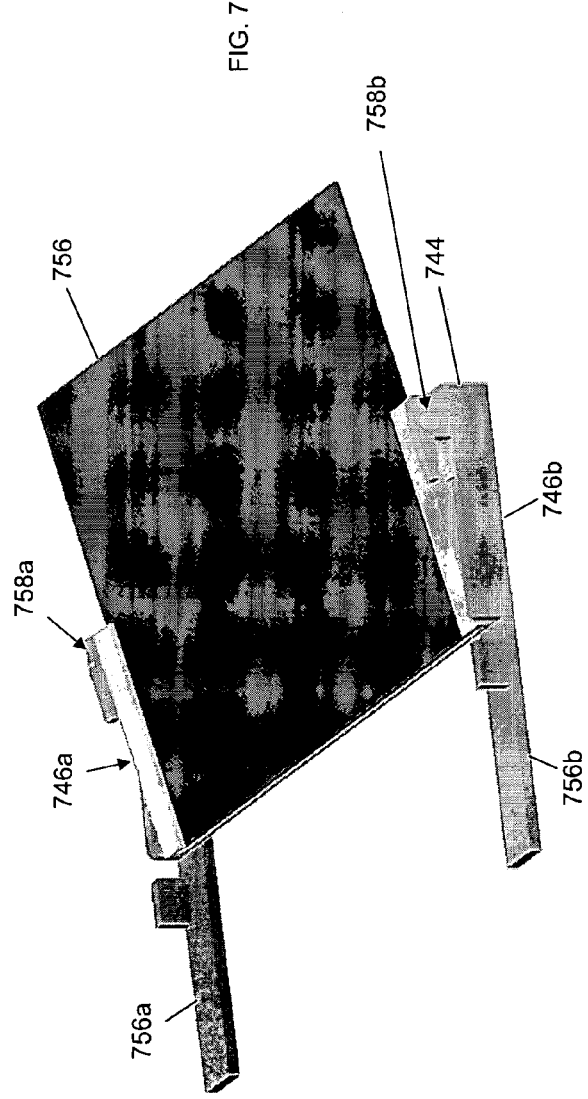
FIG. 7 is a perspective view of the plate that is coupled to the first housing and two sets of rails of the slide member.

FIG. 7 is a perspective view of the plate 756 that is coupled to the first housing 604 (see FIG. 6) and the two sets of rails of the slide member 744. The plate 756 is tilted with respect to the slide member 744 similar to the view of FIG. 5. Once the slide member 744 is fully extended so that the device 602 is in the open position and the first housing 604 drops down so that the top face 408 (see FIG. 4) of the first housing 404 and the top face 424 of the second housing 406 form contiguous surfaces, the slide member has accordingly reaching the limit of travel. By pivoting plate 756 and hence the first housing 604 with respect to the second housing 606 according to the pivot joints 758a and 758b, there may be an angle 542 (see FIG. 5) between the first housing 404 (see FIG. 4) with respect to the second housing 406. It is understood that the slide member 744 including rails 746a and 756a, and 746b and 756b, may be any suitable configuration, with fewer or more rails. Moreover, the pivot joints may be of any suitable configuration so as to tilt a housing with respect to the other housing. A detent mechanism may maintain the position of the first housing 604 with respect to the second housing 606. In addition, a biasing element may be configured to provide a resisting force to secure latching of the device into the open position.

FIG. 8 is a perspective view of another embodiment of the slider form factor device 802 incorporating a telescoping slide mechanism 860 in the open position. FIG. 8 depicts device 802 in a similar arrangement as that of device 302 (see FIG. 3). That is, the telescoping slide mechanism 860 may allow the first housing 804 to reach the end of travel. To move the device from the depicted open position to the closed position (not shown), a first rail 862 receives within itself a second rail 864 to form nested rails, by moving the first housing 804 with respect to the second housing 806 in the direction indicated by the arrow 866, so that device 802 resembles device 102 (see FIG. 1). The telescoping slide member may be configured in the opposite manner as well.

As mentioned, an autoclose operation of the slider device may initiate moving the first housing 804 in the direction of the arrow 866 to close the device when the top face 808 of the first housing 804 becomes substantially parallel to the top face 824 of the second housing 806. The closing force for the autoclose operation may be exerted by a spring 868. It is understood that various methods and mechanism may be used to secure the device in the open position and in the closed position as well as facilitate its opening and closing.

FIG. 9 is yet another perspective view of the slider form factor device 902 incorporating telescopic rails in the open position to depict the first housing 904 tilted with respect to the second housing 906. One second rail 964 extends from a first rail 962, so that the first end 910 of the first housing 904 is in contact with the second end 916 of the second housing 904. The first or upper housing 904 acquires a tilt with respect to the lower or second housing 906 and so that the first housing 904 and the second housing 906 abut one another as described above. The tilted first housing 904 is held in place by end brackets 970a and 970b.

The end brackets 970a and 970b may act, along with at least one biasing element configured to provide a resisting force, such as spring 868 (see FIG. 8) to secure latching of the device 902 into the open position. It is understood that any suitable biasing element configured to secure the device into an open position is within the scope of this discussion.

As discussed, the surface area of the lower housing 906 including QWERTY keypad 326 (see FIG. 2) may be reduced so that surface area of the face 924 is predominately utilized by the QWERTY keypad 326 since it does not overlap with the upper housing 904 that carries the display 328. The electronics, such as a controller 974 that processes control signals for the display 328 and/or the QWERTY keypad may be carried in the first housing 904 or in the second housing 906. A flex including electrical connections may be routed through the telescoping arrangement 960 of rails 962 and 964. Since FIG. 9 is a perspective drawing, another set of telescoping arrangement of rails on the side of the device facing into the page is not shown. The telescoping rails may be any shape, but are coaxial, accordingly, and may be capable of housing one or more electrical connections through their interior.

Figure 10:
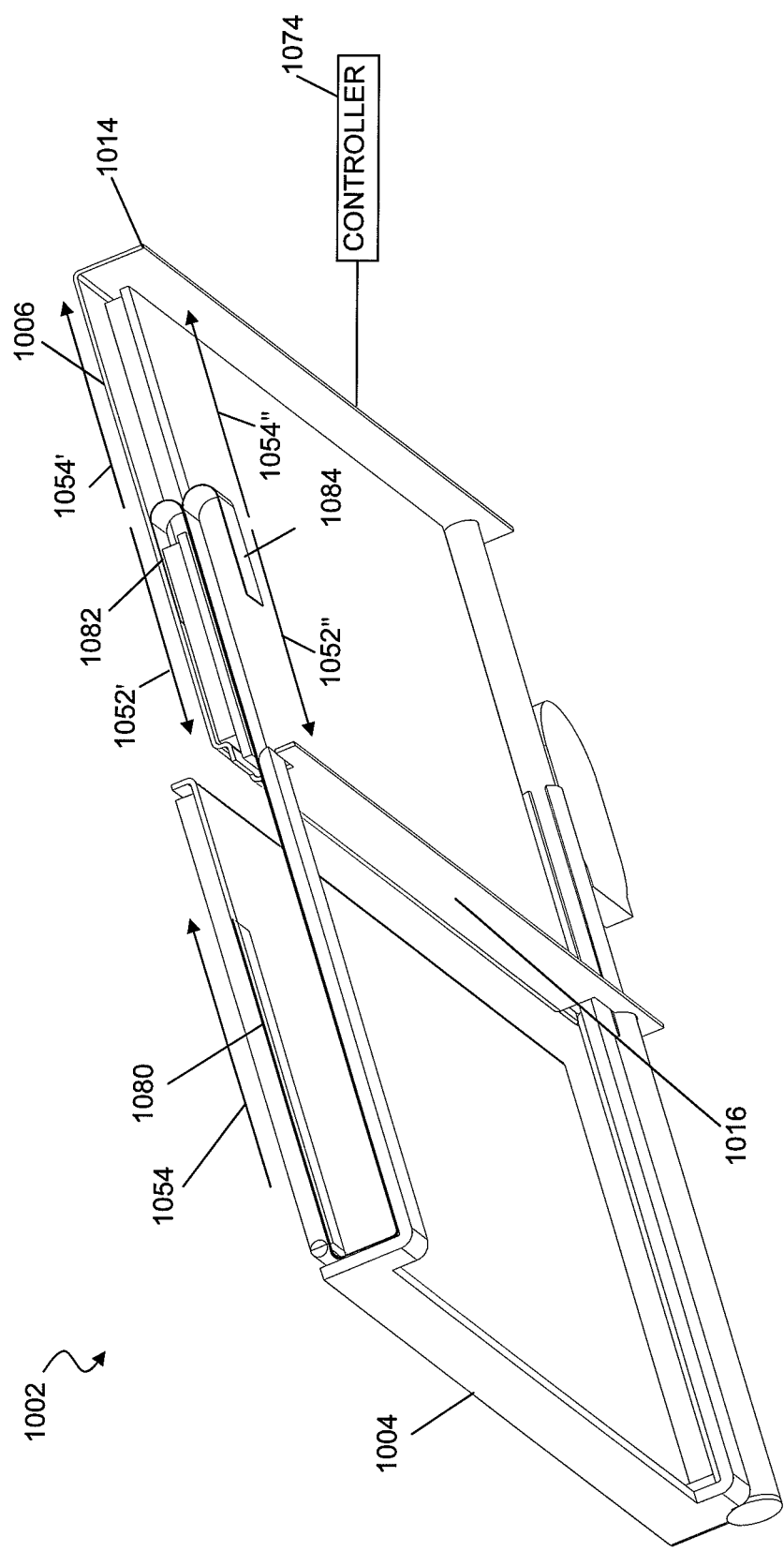
FIG. 10 depicts a structure of a slider form factor device in an open position to illustrate an embodiment of flex routing between the first housing and the second housing.

FIG. 10 depicts a structure of a slider form factor device 1002 in an open position to illustrate an embodiment of flex routing between the first housing and the second housing. A controller 1074 in the second housing 1006 is depicted and may provide controls to electronic components of the second housing 1006, for example a QWERTY keypad 326 (see FIG. 3). The controller 1074 may also provide controls to electronic components of the first housing 1004, for example, a display 328 by a flex 1080 coupled to the controller 1074 of the second housing 1006. The flex 1080 may be routed along the depicted path between the first housing 1004 and the second housing 1006 or any suitable path.

The flex 1080 can be split into two pieces 1082 and 1084 as depicted. As the first housing 1004 moves in the direction of the arrow 1054 so that it arrives in the closed position, the flex split pieces 1082 and 1084 can travel together in the direction of arrows 1054' and 1054" so that they reach end 1014. In the meantime, they may continue to split along their center so the pieces 1082 and 1084 may elongate and move in the direction of arrows 1052' and 1052" so that their ends reach end 1016. In this way an electrical connection between the first housing 1004 and the second housing 1006 may be maintained. It is understood that any manner in which to carry out the flex routing is within the scope of this discussion. For example, the flex routing may be wound around a spindle when the device 1002 is moving into the closed position, and unwind when the device 1002 is moving into the open position.

The disclosed are methods and devices of a slider form factor device include two housings that beneficially do not overlap in the open position. Accordingly, the housing of the QWERTY keypad may be minimized so that its surface area is predominately utilized by the QWERTY keypad. In this way the device as a whole may be small enough to fit in a user's hand, and the opening sliding mechanism as described above may be activated by the push of a user's thumb, requiring limited action by the user.

Since the upper housing may travel completely across the lower housing, the two housings may abut to form substantially contiguous surfaces of the top face of the lower housing and the top face of the upper housing. The first housing may be tilted with respect to the second housing. Accordingly, a predetermined angle formed between the contiguous surfaces of the QWERTY keypad surface and the display surface may provide easy viewing of the display by a user while using the keypad.

As makers of mobile communication devices, including those of cellular telephones, are increasingly adding functionality to their devices, there is also a trend toward smaller mobile communication devices. For a device including a QWERTY keypad in particular, the more surface area that is beneficially utilized, the smaller the device may be. Accordingly, a smaller and more manageable slider form factor device may be a beneficial design trend.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of a slider form factor device having an upper housing including a top face and a bottom face of the upper housing and defining a first end and a second end and a lower housing including a top face and a bottom face of the lower housing and defining a first end and a second end, the method comprising:
   sliding the bottom face of the upper housing with respect to the top face of the lower housing until a limit of travel is reached;
   pivoting the upper housing with respect to the lower housing so that the first end of the lower housing is in contact with the second end of the upper housing and the upper housing is tilted with respect to the lower housing by a predetermined angle so that an edge defined by the top face of the lower housing and the first end of the lower housing and an edge defined by the top face of the upper housing and the second end of the upper housing abut to form substantially contiguous surfaces of the top face of the lower housing and the top face of the upper housing; and
   tilting the lower housing with respect to the upper housing so that the top face of the upper housing becomes substantially parallel to the top face of the lower housing to initiate an autoclose operation of the slider device, the closing force for the autoclose operation exerted by a spring.

2. A method of a slider form factor device having an upper housing including a top face and a bottom face of the upper housing and defining a first end and a second end and a lower housing including a top face and a bottom face of the lower housing and defining a first end and a second end, the method comprising:
   sliding the bottom face of the upper housing with respect to the top face of the lower housing until a limit of travel is reached;
   pivoting the upper housing with respect to the lower housing so that the first end of the lower housing is in contact with the second end of the upper housing and the upper housing is tilted with respect to the lower housing by a predetermined angle so that an edge defined by the top face of the lower housing and the first end of the lower housing and an edge defined by the top face of the upper housing and the second end of the upper housing abut to form substantially contiguous surfaces of the top face of the lower housing and the top face of the upper housing; and
   assisting opening with a spring force once the opening force overcomes the retention due to the detent,
   wherein the slider form factor device includes a detent to retain the upper housing in a closed position with respect to the lower housing until an opening force is applied.

3. A slider form factor device configured to have a closed position and an open position, the device comprising:
   a first housing having a top face, a first end, and a second end, and defining a set of first tracks;
   a second housing having a top face, a first end, and a second end, and defining a set of second tracks;
   a slide member configured to slidably and pivotably couple the first housing and the second housing, the slide member having a first set of rails configured to travel the set of first tracks of the first housing and a second set of rails configured to travel the set of second tracks of the second housing;

wherein:
in the closed position, the first set of rails are nested within the first tracks and second set of rails are nested within the second tracks, so that the first end of the first housing is aligned with the first end of the second housing, and the second end of the first housing is aligned with the second end of the second housing; and in the open position, the first set of rails are fully extended along the first tracks and second set of rails are fully extended along the second tracks, so that the first end of the first housing is in contact with the second end of the second housing and the first housing is tilted with respect to the second housing by a predetermined angle so that a first edge defined by the top face of the first housing and the first end of the first housing and a second edge defined by the top face of the second housing and the second end of the second housing abut to form substantially contiguous surfaces of the top face of the first housing and the top face of the second housing.

4. The device of claim 3, further comprising:
a set of pivot joints, each pivot joint proximal an end of one rail of the first set of rails.

5. The device of claim 3 wherein the first set of tracks is on the exterior of the first housing.

6. The device of claim 3 wherein the second set of track is in the interior of the second housing.

7. The device of claim 3, further comprising:
a detent to keep the first housing and the second housing secured in the closed position.

8. The device of claim 3, further comprising:
a biasing element configured to provide an opening assist and to provide a resisting force on closing.

9. The device of claim 3, further comprising:
a biasing element configured to provide a resisting force to secure latching of the device into the open position.

10. The device of claim 3, further comprising:
a plurality of magnets to hold the first housing and the second housing in two respective relative positions, the open position and the closed position.

11. The device of claim 3, further comprising:
a flex routing configured to couple circuitry of the first housing with circuitry of the second housing.

12. A slider form factor device configured to have a closed position and an open position, the device comprising:
a first housing having a top face, a first end, and a second end;
a second housing having a top face, a first end, and a second end;
a slide member configured to slidably and pivotably couple the first housing and the second housing, the slide member including at least one first rail having a fixed end and at least one second rail supporting a pivot element and having a fixed end, the at least one first rail and the at least one second rail slidably coupled so as to form a telescoping arrangement of rails;

wherein:
the fixed end of the first rail is secured to the first housing;
the fixed end of the second rail is secured to the second housing;
in the closed position, the at least one first rail is nested within the at least one second rail, so that the first end of the first housing is aligned with the first end of the second housing, and the second end of the first housing is aligned with the second end of the second housing; and
in the open position, the at least one first rail extends from the at least one second rail, so that the first end of the first housing is in contact with the second end of the second housing and the second housing is tilted at the pivot element with respect to the first housing by a predetermined angle so that an edge defined by the top face of the first housing and the first end of the first housing and an edge defined by the top face of the second housing and the second end of the second housing abut to form substantially contiguous surfaces of the top face of the first housing and the top face of the second housing.

13. The slider form factor device of claim 12 wherein telescoping arrangement of rails are coaxial to one another.

14. The slider form factor device of claim 12, further comprising:
a controller in the second housing;
a display in the first housing and coupled to the controller; and
a flex routing configured to couple the display of the first housing to the controller of the second housing.

15. The device of claim 12, further comprising:
a flex routing configured to couple circuitry of the second housing with circuitry of the first housing.

16. The slider form factor device of claim 12, further comprising:
a biasing element configured to provide an opening assist and to provide a resisting force on closing.

17. The slider form factor device of claim 12, further comprising:
a biasing element configured to provide a resisting force to secure latching of the device into the open position.

18. The slider form factor device of claim 12, further comprising:
a detent to keep the first housing and the second housing secured in the closed position.

19. The slider form factor device of claim 12, further comprising:
a plurality of magnets to hold the first housing and the second housing in two respective relative positions, the open position and the closed position.

* * * * *